Nov. 22, 1960 W. A. PAPWORTH 2,961,016
PORTABLE POWER RECIPROCATING SAW
Filed Aug. 7, 1956 3 Sheets-Sheet 1
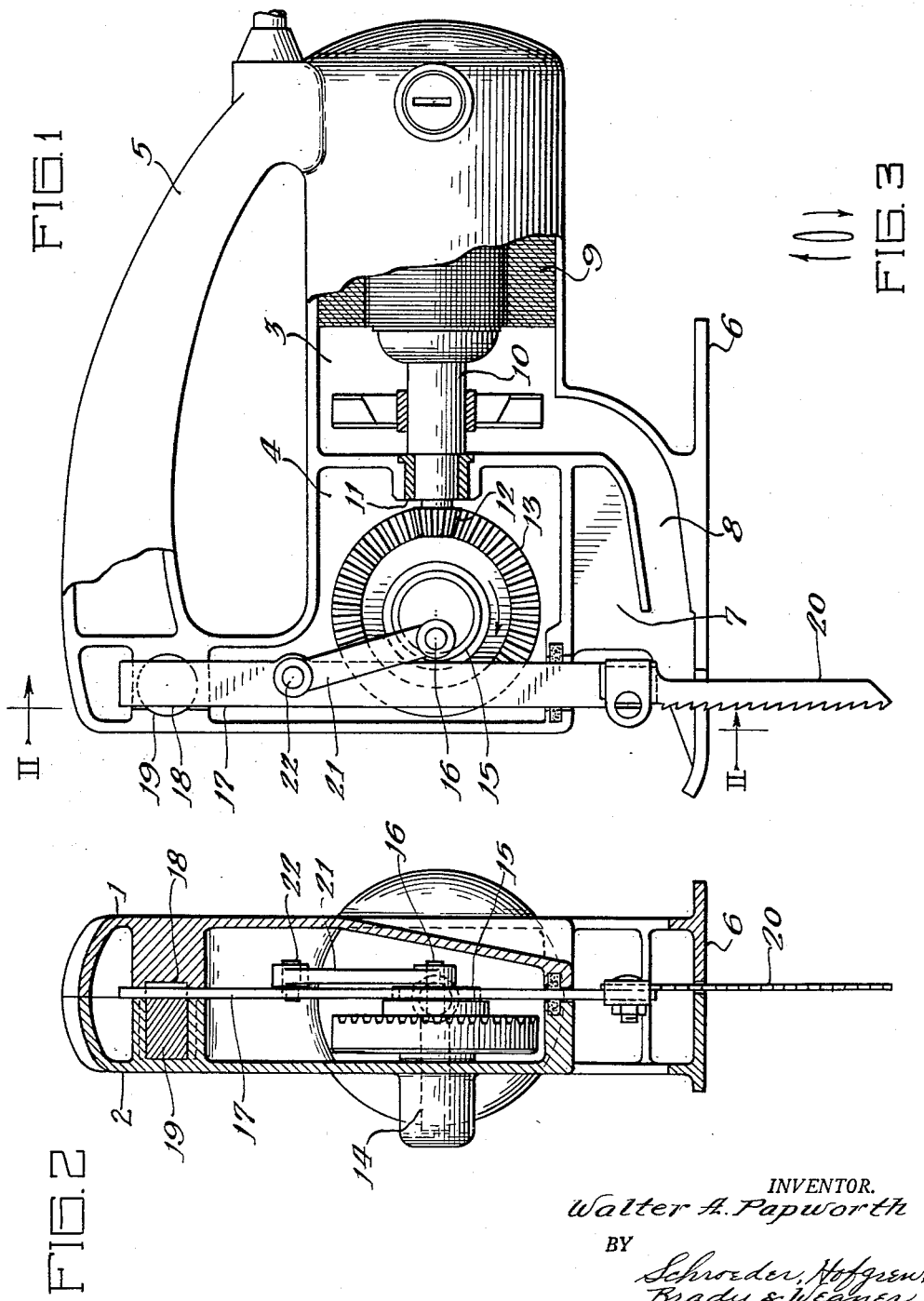
INVENTOR.
Walter A. Papworth
BY
Schroeder, Hofgren,
Brady & Wegner
Attorneys

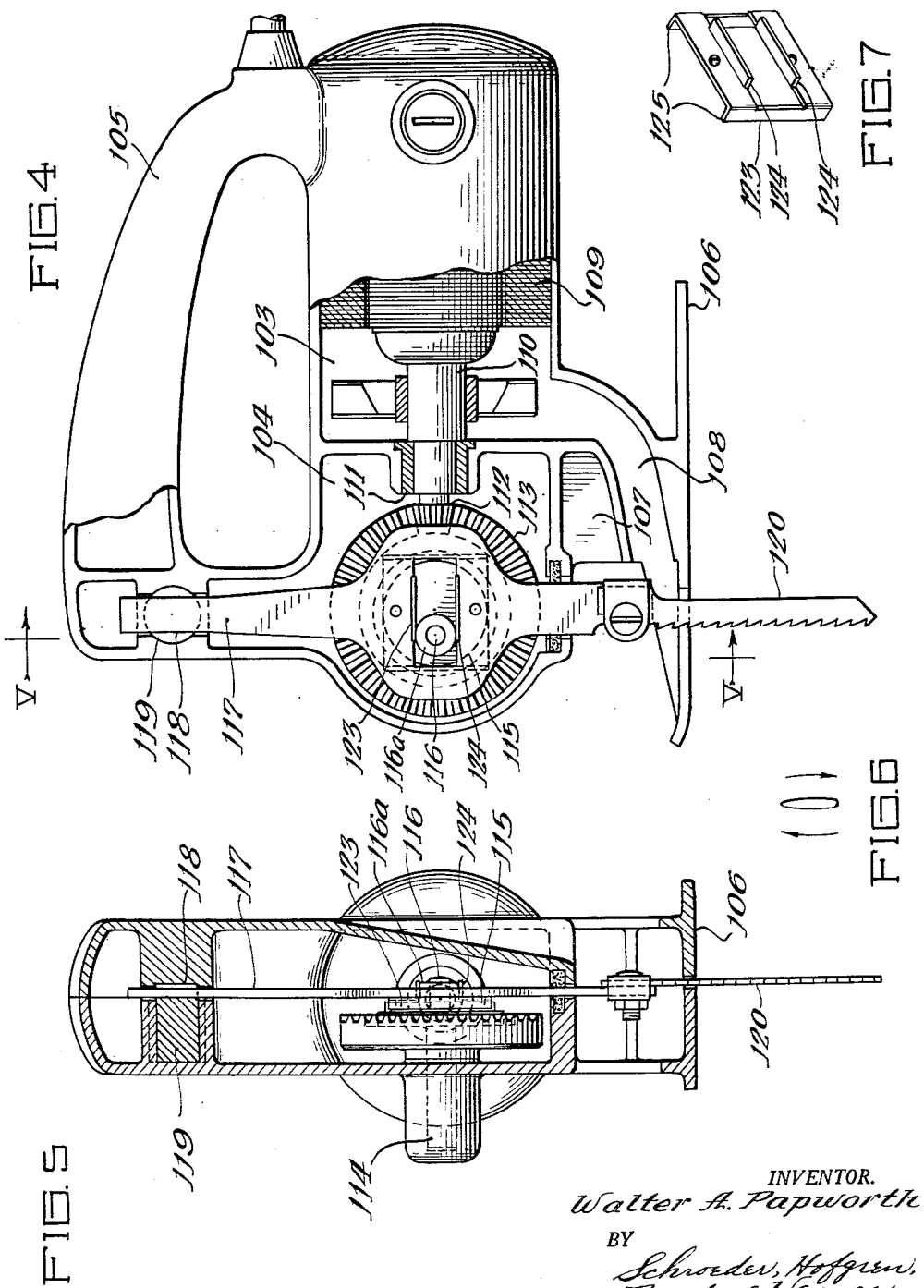

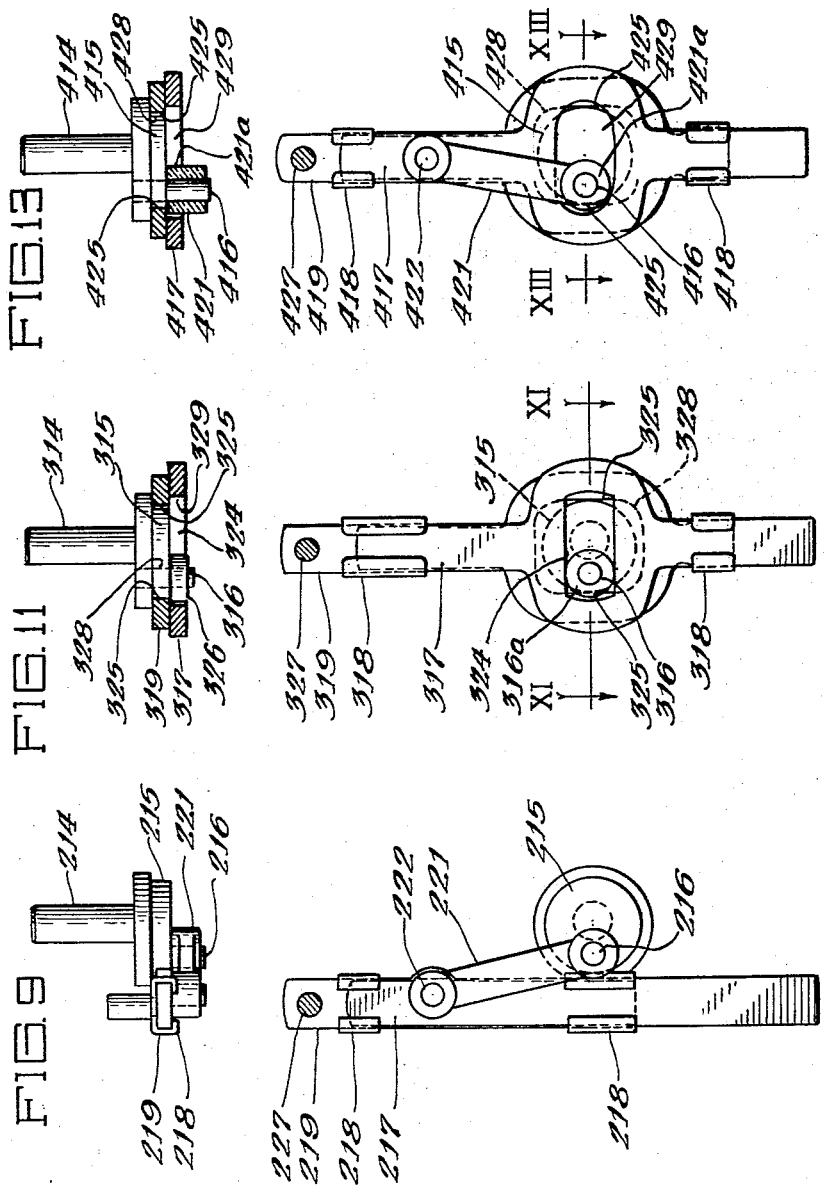

2,961,016

PORTABLE POWER RECIPROCATING SAW

Walter A. Papworth, 110 Berkeley Drive, Syracuse, N.Y.

Filed Aug. 7, 1956, Ser. No. 602,530

13 Claims. (Cl. 143—68)

This invention relates to a manually portable power driven cutting tool, and in particular it relates to a bayonet saw which is provided with a simplified mechanism for moving a saw blade in a slender modified oval path. More particularly it relates to such a tool in which the reciprocable element is mounted for endwise and arcuate movement, and wherein the arcuate movement is provided by direct contact with an eccentric on a rotating shaft.

The principal object of this invention is to provide a tool of this nature which is simple, effective, and low in cost.

A further object is to provide such a tool with fewer moving parts than have heretofore been required.

Still a further object is to provide a mechanism which is well adapted for mounting in a frame for use as an attachment to mount under a stationary saw table, or on a portable circular saw or other portable power tool, for operation by the motor and shaft thereof.

The invention is illustrated in the accompanying drawings, in which:

Fig. 1 is a side elevational view of a first form of tool embodying the invention, with part of the frame cut away;

Fig. 2 is a section taken as indicated along the line II—II of Fig. 1;

Fig. 3 is a diagram of the orbit of a point on the cutting tool showing the lower half wider than the upper half;

Fig. 4 is a side elevational view of a second form of tool embodying the invention with part of the frame cut away;

Fig. 5 is a section taken as indicated along the line V—V of Fig. 4;

Fig. 6 is a diagram of the orbit produced by the second form;

Fig. 7 is an isometric view of an insert for the tool plunger;

Fig. 8 is a side elevational view of a modified tool plunger and guide which may be substituted in the device of Fig. 1 for the corresponding parts there shown;

Fig. 9 is a plan view of the mechanism of Fig. 8;

Fig. 10 is a side elevational view of a modified tool plunger and guide which may be substituted in the device of Fig. 4 for the corresponding parts there shown;

Fig. 11 is a section taken as indicated along the line XI—XI of Fig. 10;

Fig. 12 is a side elevational view of a tool plunger, guide and drive which is basically a composite of the mechanisms shown in Figs. 8 and 10; and Fig. 13 is a section taken as indicated along the line XIII—XIII of Fig. 12.

Referring now to the drawings in greater detail, and referring first to Figs. 1 and 2, the tool frame includes a motor housing 3, a gear case 4, a handle 5, a foot plate 6 which is adapted to normally support the tool upon the work, and a cavity 7 above the foot plate containing an air blast duct 8. As illustrated, the frame is made of two opposite halves 1 and 2 abutting on the center plane of the device as seen in Figs. 2 and 5, but other structure may be used.

A motor 9 has its shaft 10 journalled in a bearing 11 mounted in the frame. A pinion 12 on the motor shaft meshes with a gear 13, which is mounted on a shaft 14 journalled in the frame; and the gear is provided with a slightly eccentric crank disc or cam 15, and a crank pin 16 extending therefrom.

A tool plunger 17 is slidably supported in a groove 18 formed in a guide member 19, which is mounted in the frame for rocking movement on an axis parallel to that of the crank disc 15, so that the tool plunger can have both endwise and arcuate movement, and is positioned to bear on the eccentric 15. A cutting tool 20 is secured to the tool plunger. A connecting rod 21 has one end pivotally connected to the tool plunger 17 at 22, and has its other end journalled on the crank pin 16, so that as the gear 13 is rotated the tool plunger on its cutting stroke is pushed upward by the connecting rod 21 and forward by the eccentric disc 15, while on its return stroke it is pulled downward and backward by the connecting rod, so as to be given a sectoral motion. This moves the cutting tool in an orbit substantially as shown in Fig. 3, the lower half of the orbit being wider than its upper half by reason of its greater radial distance from the pivot point of the guide member 19.

In the form of the tool shown in Figs. 4 to 7, all the elements are the same as in the first form except for the driving connection between the tool plunger and the gear; so the like elements of the second form are not described in detail but are given reference numerals in the drawings which are 100 higher than those of the first form.

In this form, substantially the same sectoral movement of the tool plunger 117, and thus the same movement of the cutting tool is accomplished without the connecting rod by mounting on the inner side of tool plunger 117 a Scotch yoke member 123 which has outwardly extending horizontal flanges 124 projecting through an opening in the tool plunger and engaged by a roller 116a on a crank pin 116, and which has inwardly extending vertical flanges 125 engaging the eccentric crank disc 115. The crank disc may be provided with a roller rim if desired. Fig. 6 shows the shape of orbit produced. As seen in Fig. 7, the Scotch yoke member 123 may be readily formed from a single rectangular tempered steel blank.

Figs. 8 to 13 inclusive show three variations of the device using a modified form of tool plunger and a guide member which is elongated downward past the crank disc and receives the arcuate impulse therefrom.

In Figs. 8 and 9, a relatively short tool plunger 217 is slidably supported in guide flanges 218 of an elongated guide member 219 which is pivotally mounted in the frame on a pin 227 for rocking movement on an axis parallel to that of an eccentric 215. The tool plunger is directly driven by a connecting rod 221 which connects a crank pin 216 on eccentric 215 with a pin 222 on the plunger. The eccentric 215 bears on guide member 219 and the result is to produce sectoral movement of the tool plunger.

In Figs. 10 and 11, a relatively short tool plunger 317 is slidably mounted in guide flanges 318 of an elongated guide member 319 which is pivotally mounted in the frame on a pin 327 for rocking movement on an axis parallel to that of a crank disc 315. The guide member 319 is formed with a hole 328 whose vertical sides 325 form a Scotch yoke engaging crank disc 315 on shaft 314. The tool plunger 317 is formed with a hole 329 whose horizontal sides 324 form a Scotch yoke engaging a roller 316a on crank pin 316, so that sectoral movement is imparted to tool plunger 317.

In Figs. 12 and 13, a short tool plunger 417 is slidably mounted in guide flanges 418 of an elongated guide member 419 which is pivotally mounted in the frame on a fulcrum 427 above the shaft, so that the guide member is rockable on an axis parallel to that of a crank disc 415. The guide member 419 is formed with a hole 428 whose vertical edges 425 form a Scotch yoke engaging crank disc 415 on shaft 414. The tool plunger 417 is driven by a connecting rod 421 which connects a crank pin 416 with a pin 422 on the plunger; and the plunger has a hole 429 providing clearance for the hub portion 421a of the connecting rod 421. This is a composite of the mechanisms shown in Figs. 8 and 10; and also imparts sectoral movement to tool plunger 417.

The foregoing detailed description is given for clearness of understanding only and no unnecessary limitations are to be understood therefrom, as some modifications will be obvious to those skilled in the art.

I claim:

1. A reciprocating saw comprising: a frame; a power driven shaft journalled in the frame; an eccentric crank disc of relatively small eccentricity and an eccentric crank pin of relatively large eccentricity both carried on said shaft; guide means supported in the frame for rocking movement about an axis parallel to that of said crank disc; tool carrying means mounted for endwise movement in and having the upper portion embraced by said guide means, one of said means having a surface in contact with said crank disc; an elongated cutting tool secured to said tool carrying means; and drive means interconnecting the crank pin and the tool carrying means to move said carrying means endwise in said guide means, said two eccentrics, said one of said means and said drive means cooperating to impart sectoral motion to the carrying means about the axis of rocking movement of the guide means and thereby to move the cutting tool in a slender and non-translatory oval path which carries the tool edgewise toward the work on its cutting stroke.

2. A reciprocating saw comprising: a frame; a power driven shaft journalled in the frame; an eccentric crank disc of relatively small eccentricity and an eccentric crank pin of relatively large eccentricity both carried on said shaft; guide means supported in the frame for rocking movement about an axis parallel to that of said crank disc; tool carrying means mounted for endwise movement in and having its upper portion embraced by said guide means, one of said means having a surface in contact with said crank disc; an elongated cutting tool secured to said tool carrying means; and a connecting rod journalled on said crank pin and pivotally connected to said tool carrying means to move said carrying means endwise in said guide, said two eccentrics, said one of said means and said drive means cooperating to impart sectoral motion to the carrying means about the axis of rocking movement of the guide means and thereby to move the cutting tool in a slender and non-translatory oval path which carries the tool edgewise toward the work on its cutting stroke.

3. A reciprocating saw comprising: a frame; a power driven shaft journalled in the frame; an eccentric crank disc of relatively small eccentricity and an eccentric crank pin of relatively large eccentricity both carried on said shaft; guide means supported in the frame for rocking movement about an axis parallel to that of said crank disc; tool carrying means mounted for endwise movement in and having the upper portion embraced by said guide means; an elongated cutting tool secured to said tool carrying means; a longitudinal scotch yoke on one of said means which has guide surfaces extending longitudinally of the tool carrying means in operative engagement with said eccentric crank disc; and a transverse scotch yoke on the other of said means operatively engaged with said eccentric crank pin to move said tool carrying means endwise in said guide means, said two eccentrics, said two named means and said two scotch yokes cooperating to impart sectoral motion to the carrying means about the axis of rocking movement of the guide means and thereby to move the cutting tool in a slender and non-translatory oval path which carries the tool edgewise toward the work on its cutting stroke.

4. A reciprocating saw comprising: a frame, a power driven shaft journalled in the frame; an eccentric crank disc of relatively small eccentricity and an eccentric crank pin of relatively large eccentricity both carried on said shaft; guide means supported in the frame for rocking movement about an axis parallel to that of said crank disc; tool carrying means mounted for endwise movement in and having the upper portion embraced by said guide means; an elongated cutting tool secured to said tool carrying means; a longitudinal scotch yoke on the guide means having a surface in operative engagement with said crank disc; and a connecting rod journalled on said crank pin and pivoted to the tool plunger to move said tool plunger endwise in said guide means, said two eccentrics, said tool carrying means, said longitudinal scotch yoke and said connecting rod cooperating to impart sectoral motion to the carrying means about the axis of rocking movement of the guide means and thereby to move the cutting tool in a slender and non-translatory oval path which carries the tool edgewise toward the work on its cutting stroke.

5. A reciprocating saw comprising: a frame; a power driven shaft journalled in the frame; an eccentric crank disc of relatively small eccentricity and an eccentric crank pin of relatively large eccentricity both carried on said shaft; a cylindrical guide plug supported in the frame for rocking movement about an axis parallel to that of said crank disc; said guide plug having a slot; and elongated tool plunger the upper end of which is slidably received in said slot, said tool plunger having a surface in contact with said crank disc; an elongated cutting tool secured to said plunger at the end opposite said guide plug; and drive means interconnecting the crank pin and the tool plunger to move said plunger endwise in said guide plug, said two eccentrics, said guide plug, said tool plunger, and said drive means cooperating to impart sectoral motion to the carrying means and thereby to move the cutting tool in a slender and non-translatory oval path which carries the tool edgewise toward the work on its cutting stroke.

6. A reciprocating saw comprising: a frame; a power driven shaft journalled in the frame; an eccentric crank disc of relatively small eccentricity and an eccentric crank pin of relatively large eccentricity both carried on said shaft; a cylindrical guide plug supported in the frame for rocking movement about an axis parallel to that of said crank disc; said guide plug having a slot; an elongated tool plunger the upper end portion of which is slidably received in said slot, said tool plunger having a surface in contact with said crank disc; an elongated cutting tool secured to said plunger at the end opposite said guide plug; and a connecting rod journalled on said crank pin and pivotally connected to the tool plunger to move said plunger endwise in said guide plug, said two eccentrics, said guide plug, said tool plunger, and said connecting rod cooperating to impart sectoral motion to the carrying means and thereby to move the cutting tool in a slender and non-translatory oval path which carries the tool edgewise toward the work on its cutting stroke.

7. A reciprocating saw comprising: a frame; a power driven shaft journalled in the frame; an eccentric crank disc of relatively small eccentricity and an eccentric crank pin of relatively large eccentricity both carried on said shaft; a cylindrical guide plug supported in the frame for rocking movement about an axis parallel to that of said crank disc; said guide plug having a slot; an elongated tool plunger the upper end portion of which is slidably received in said slot for endwise movement therein; an elongated cutting tool secured to said plunger at the end opposite said guide plug; a longitudinal scotch yoke on the tool plunger having a surface operatively engaged with the crank disc; and a transverse scotch yoke on said tool plunger operatively engaged with said crank pin to move said tool plunger endwise in said slot of said guide plug, said two eccentrics, said guide plug, said tool plunger, and said two scotch yokes cooperating to impart sectoral motion to the carrying means about the axis of rocking movement of the guide plug and thereby to move the cutting tool in a slender and non-translatory oval path which carries the tool edgewise toward the work on its cutting stroke.

8. A reciprocating saw comprising: a frame; a power driven shaft journalled in the frame; an eccentric crank disc of relatively small eccentricity and an eccentric crank pin of relatively large eccentricity both carried on said shaft; an elongated guide member pivotally mounted in the frame at a point remote from said shaft for rocking movement about an axis parallel to that of said crank disc; said guide member having a portion in contact with said crank disc, and being provided with longitudinally extending parallel guideways; a tool plunger mounted for endwise movement in and having the upper portion embraced by said guideways; an elongated cutting tool secured to said plunger; and drive means interconnecting the crank pin and the tool plunger to move said plunger endwise in said guideways, said two eccentrics, said guide member, and said drive means cooperating to impart sectoral motion to the carrying means about the axis of rocking movement of the guide member and thereby to move the cutting tool in a slender and non-translatory oval path which carries the tool edgewise toward the work on its cutting stroke.

9. A reciprocating saw comprising: a frame; a power driven shaft journalled in the frame; an eccentric crank disc of relatively small eccentricity and an eccentric crank pin of relatively large eccentricity both carried on said shaft; an elongated guide member pivotally mounted in the frame at a point remote from said shaft for rocking movement about an axis parallel to that of said crank disc; said guide member having a portion in contact with said crank disc and being provided with longitudinally extending parallel guideways; a tool plunger mounted for endwise movement in and having the upper portion embraced by said guideways; an elongated cutting tool secured to said plunger; and a connecting rod journalled on said crank pin and pivoted to said tool plunger to move said plunger endwise in said guide member, said two eccentrics, said guide member and said connecting rod cooperating to impart sectoral motion to the carrying means about the axis of rocking movement of the guide member and thereby to move the cutting tool in a slender and non-translatory oval path which carries the tool edgewise toward the work on its cutting stroke.

10. A reciprocating saw comprising: a frame; a power driven shaft journalled in the frame; an eccentric crank disc of relatively small eccentricity and an eccentric crank pin of relatively large eccentricity both carried on said shaft; a guide member pivotally mounted in the frame at a point remote from said shaft for rocking movement about an axis parallel to that of said crank disc; said guide member having longitudinally extending parallel guideways; a longitudinal scotch yoke on said guide member having a surface operatively engaged with said eccentric crank disc; a tool plunger mounted for endwise movement in and having the upper portion embraced by said guideways; an elongated cutting tool secured to said plunger; and a transverse scotch yoke on said plunger operatively engaged with said eccentric crank pin to move said tool plunger endwise in said guide member, said two eccentrics, said guide member and said two scotch yokes cooperating to impart sectoral motion to the carrying means about the axis of rocking movement of the guide member and thereby to move the cutting tool in a slender and non-translatory oval path which carries the tool edgewise toward the work on its cutting stroke.

11. A reciprocating saw comprising: a frame; a power driven shaft journalled in the frame; an eccentric crank disc of relatively small eccentricity and an eccentric crank pin of relatively large eccentricity both carried on said shaft; a guide member pivotally supported in the frame at a point remote from said shaft for rocking movement about an axis parallel to that of said crank disc; said guide member having longitudinally extending, parallel guideways; a longitudinal scotch yoke on said guide member having a surface operatively engaged with said crank disc; a tool plunger mounted for endwise movement in and having the upper portion embraced by said guideways, said tool plunger having an opening surrounding said crank pin; an elongated cutting tool secured to said plunger; and a connecting rod journalled on said crank pin and pivoted to said tool plunger to move said plunger endwise in said guide member, said two eccentrics, said guide member, said scotch yoke and said connecting rod cooperating to impart sectoral motion to the carrying means about the axis of rocking movement of the guide member and thereby to move the cutting tool in a slender and non-translatory oval path which carries the tool edgewise toward the work on its cutting stroke.

12. A reciprocating saw comprising: a frame; a power driven shaft journalled in the frame; an eccentric crank disc of relatively small eccentricity and an eccentric crank pin of relatively large eccentricity both carried on said shaft; guide means in the frame; tool carrying means mounted in the frame, said tool carrying means being movable endwise in and having its upper portion embraced by the guide means, and said tool carrying means and said guide means being rockable together about an axis parallel to that of said disc, one of said means having a surface in contact with said crank disc; an elongated cutting tool secured to said tool carrying means; and drive means interconnecting the crank pin and the tool carrying means to move said tool carrying means endwise in and rock it with said guide means, said two eccentrics, said one of said means and said drive means cooperating to impart sectoral motion to the carrying means about the axis of rocking movement of the guide means and thereby to move the cutting tool in a slender and non-translatory oval path which carries the tool edgewise toward the work on its cutting stroke.

13. A reciprocating saw comprising: a frame; a power driven shaft journalled in the frame; an eccentric crank disc of relatively small eccentricity and an eccentric crank pin of relatively large eccentricity both carried on said shaft; guide means supported in the frame for rocking movement about an axis parallel to that of said crank disc; tool carrying means mounted for endwise movement in and having the upper portion embraced by said guide means; an elongated cutting tool secured to the lower end of said tool carrying means; a longitudinal scotch yoke on the tool carrying means having a surface operatively engaged with the crank disc; and a transverse scotch yoke on said tool carrying means operatively engaged with said crank pin to move said tool carrying means endwise in said guide means, said two eccentrics, said guide means, said tool carrying means, and said two scotch yokes cooperating to impart sectoral motion to the carrying means about the axis of rocking movement of the guide means and thereby to move the cutting tool in a slender and non-translatory oval path which carries the tool edgewise toward the work on its cutting stroke.

References Cited in the file of this patent

UNITED STATES PATENTS

| | | |
|---|---|---|
| 3,287 | Marsh | Sept. 28, 1843 |
| 1,043,775 | Koons | Nov. 5, 1912 |
| 1,269,883 | Wardman | June 18, 1918 |
| 1,303,561 | Johnson | May 13, 1919 |
| 1,855,371 | Ungar | Apr. 26, 1932 |
| 2,619,133 | Vulliet-Durand | Nov. 25, 1952 |
| 2,705,980 | Papworth | Apr. 12, 1955 |
| 2,737,984 | Bruck | Mar. 13, 1956 |
| 2,781,800 | Papworth | Feb. 19, 1957 |